US012669869B2

(12) United States Patent
Tehrani et al.

(10) Patent No.: US 12,669,869 B2
(45) Date of Patent: Jun. 30, 2026

(54) DYNAMIC PACKAGING FOR A WEARABLE BIONSENSOR

(71) Applicant: AQUILX INCORPORATED, Bonsall, CA (US)

(72) Inventors: Farshad Tehrani, Bonsall, CA (US); Hazhir Teymourian, San Diego, CA (US); Brian Wuerstle, Pacifica, CA (US)

(73) Assignee: AQUILX, INC., Bonsall, CA (US)

( * ) Notice: Subject to any disclaimer, the term of this patent is extended or adjusted under 35 U.S.C. 154(b) by 0 days.

(21) Appl. No.: 19/067,798

(22) Filed: Feb. 28, 2025

(65) Prior Publication Data

US 2025/0271933 A1 Aug. 28, 2025

Related U.S. Application Data

(60) Provisional application No. 63/748,943, filed on Jan. 23, 2025, provisional application No. 63/725,541, filed on Nov. 27, 2024, provisional application No. 63/559,116, filed on Feb. 28, 2024.

(51) Int. Cl.
| | |
|---|---|
| *G06F 3/01* | (2006.01) |
| *G06F 1/16* | (2006.01) |
| *G06F 1/18* | (2026.01) |
| *G06F 3/044* | (2006.01) |
| *G06F 3/16* | (2006.01) |

(52) U.S. Cl.
CPC .............. *G06F 3/015* (2013.01); *G06F 1/163* (2013.01); *G06F 1/1635* (2013.01); *G06F 1/1698* (2013.01); *G06F 1/189* (2013.01); *G06F 3/016* (2013.01); *G06F 3/044* (2013.01); *G06F 3/167* (2013.01)

(58) Field of Classification Search
CPC .................................. G06F 3/015; G06F 1/163
See application file for complete search history.

(56) References Cited

U.S. PATENT DOCUMENTS

2020/0196919 A1* 6/2020 Rao ..................... A61B 5/14503
2022/0338762 A1* 10/2022 Halac ................... A61B 5/1473

* cited by examiner

*Primary Examiner* — Jerry Wu
(74) *Attorney, Agent, or Firm* — Joseph S. Bird

(57) ABSTRACT

The invention is a dynamic packaging system for wearable biosensors including components for securing the biosensor in place, for assisting insertion of the biosensors into the skin of a user in a fashion which guides the user to an appropriate amount of force, for sensing environmental conditions, for communicating with the biosensor and another external device running a mobile app. A receptacle holding the biosensor is the location for various electrical components enabling these functions. In separate embodiments, a cap or a peelable film is provided for a tight seal to preserve sterility inside the packaging system prior to insertion of the biosensor.

20 Claims, 11 Drawing Sheets

DYNAMIC PACKAGING FOR A WEARABLE BIONSENSOR

STATEMENT REGARDING RELATED APPLICATIONS

This application claims priority to, and the full benefit of, U.S. provisional patent application No. 63/559,116 filed Feb. 28, 2024; U.S. provisional patent application No. 63/725,541 filed Nov. 27, 2024; and U.S. provisional patent application No. 63/748,943 filed Jan. 23, 2025. The present application expressly incorporates U.S. patent application Ser. No. 18/528,763 (filed Dec. 4, 2023 and published on Jan. 25, 2025 as US2025/0025077) in its entirety.

GOVERNMENT RIGHTS

The invention was made with US government support under grant number 5R44AA030231-03 awarded by the National Institute on Alcohol Abuse and Alcoholism, and grant number IR43DA059516 awarded by the National Institute on Drug Abuse. The US government has certain rights in the invention.

FIELD OF THE INVENTION

The field of the invention is packaging for wearable biosensors which are insertable into the skin.

ASPECTS OF THE INVENTION

An applicator for a wearable biosensor is a mechanical device with mechanical, spring-loaded pieces for probe insertions which is included in prior art sterile packages with a wearable biosensor. The applicator is provided by the makers of those products because the applicator provides enough force to enable an implantable filament or microprobe array to pierce the skin reliably. Conventional applicators for wearable biosensors, such as prior art CGMs, rely on mechanical mechanisms to insert and retract long, thick needles that deliver and position filaments into fat tissue. See, for example, U.S. Pat. No. 9,615,779 and US published patent application #US20200196919 which are designed for repeatable force application but require excessive mechanical force due to the needle size. This invention eliminates the need for such applicators by introducing a novel mechanism applying biosensor with microprobe arrays below 1 mm in length and 300 microns in diameter, with sub-10-micron tips. This advancement significantly reduces the required insertion force while allowing for a more dynamic and personalized application based on individual application site characteristics. Unlike conventional applicators, the invention features a multifunctional receptacle that holds the sensor and assists in its application. This novel receptacle enables real-time adjustments to the application force using other physical sensors embedded, depth, and method according to the user's skin and body characteristics, enhancing adaptability, comfort, and usability.

Elimination of the applicator as a device separate from the sensor packaging, then, is one aspect of the novelty of the invention, but there are a number of other benefits of the invention also, as described herein.

The invention is a novel sterile package for a wearable biosensor without an applicator but which incorporates features to assist the user in inserting the filament or microprobe array into the skin.

The invention is useful because insertion of the microprobes of a wearable biosensor can suffer from either too little pressure to pierce the skin or too much pressure which can damage the microprobes. A wearable biosensor with some aspects of the invention has been described previously by the present inventors and applicant (US patent publication US 2025/0025077 published Jan. 25, 2025), but placing these capabilities in the packaging itself is novel.

The invention herein is configured as packaging for wearable biosensors of all kinds including, without limitation, the type disclosed in U.S. Pat. No. 12,171,555 and U.S. patent application Ser. No. 18/586,283 bearing publication #US 2024/0285236 A1.

ADDITIONAL ASPECTS OF THE INVENTION

Figures 1A, 1B, 1C:
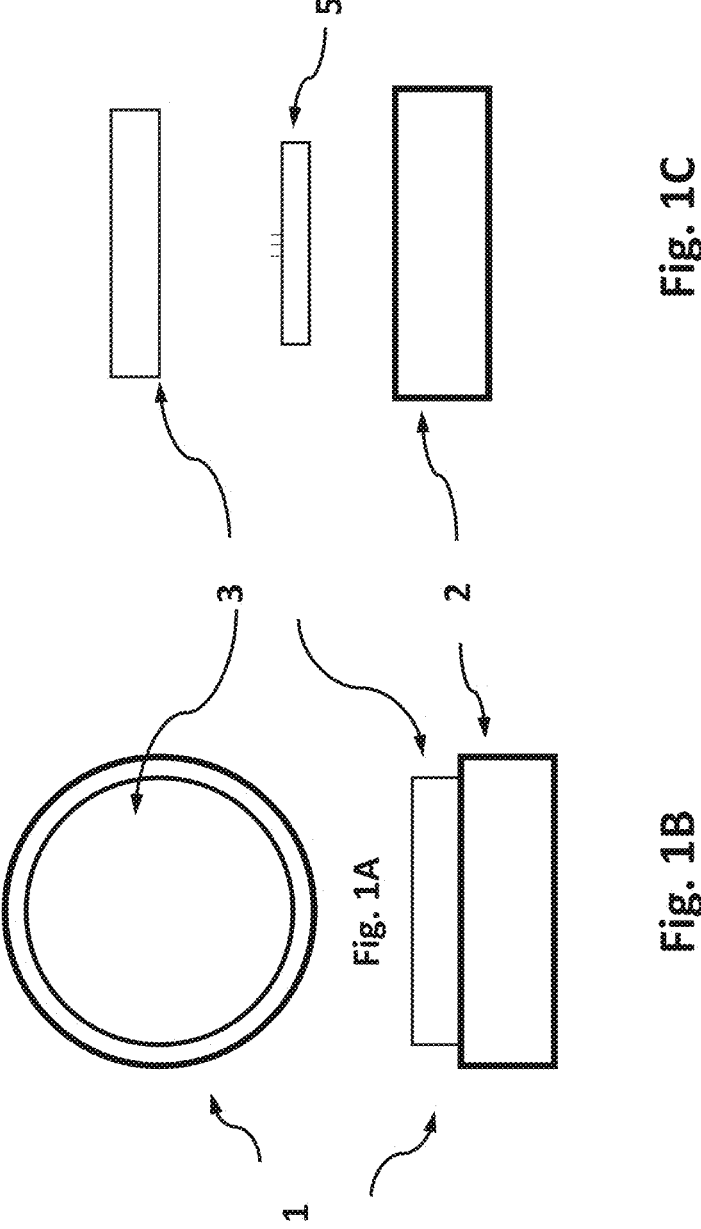
FIGS. 1A-1C are diagrams of an embodiment of the invention with a cap.

As used herein, the terms, "microprobe" and "microprobes," include microprobes of a length less than a millimeter, and also filaments of longer than a millimeter, which are designed for insertion through the skin of a user.

The invention 1 is a dynamic package which houses a wearable biosensor 5 before insertion by the user, and which then assists the user with insertion.

The invention comprises a receptacle 2 which with a cap 3 or a peelable film 14, in different embodiments, form a liquid and air tight seal in which the wearable biosensor is stored in a sterilized state prior to use. The receptacle in one embodiment has at least one magnet 15 keeping the biosensor in a secure position in the main compartment 2A which is an opening defined by the at least one inner wall 9A and bottom 9C. In another embodiment there are provided holders 11 on the inner wall 9A and/or bottom 9C which secure the wearable biosensor in place. The holders are positioned on the inner wall and/or bottom of the main compartment to secure the biosensor and allow it to hover within the main compartment. The holders may be comprised of flexible or rigid material.

The peelable film and the cap perform a similar function: providing an air and liquid tight seal for the receptacle holding the wearable biosensor. In an embodiment with the cap, around the main compartment enclosed by a wall 9 is a closure compartment in which threads or friction fit components provide joinder of the cap and receptacle. Other means for sealing the invention are provided herein.

The receptacle and its cap may be constructed from medical-grade polymers chosen for their strength, durability, and biocompatibility. Common materials include polycarbonate (PC), which offers high impact resistance, dimensional stability, and strength, making it ideal for structural components. Another commonly used material is acrylonitrile butadiene styrene (ABS), valued for its balance of toughness, rigidity, and ease of molding, allowing for cost-effective and precise manufacturing. Polyoxymethylene (POM), also known as acetal, is used in cases where low friction and high wear resistance are required, particularly in moving parts within the cap or locking mechanisms. Polypropylene (PP) and polyethylene (PE) are widely used due to their lightweight nature, chemical resistance, and cost efficiency, making them ideal choices for disposable medical devices. Additionally, thermoplastic elastomers (TPE) may be incorporated into specific areas, such as seals or gripping surfaces, to provide flexibility and a soft-touch feel while ensuring a secure closure.

The peelable film covering the receptacle is typically composed of one or more layers of polymers and/or metals to provide an effective barrier against moisture, oxygen, and contaminants, while also ensuring sterility and controlled peelability. This film often includes polyethylene (PE), polypropylene (PP), or polyethylene terephthalate (PET) for their flexibility, seal integrity, and resistance to tearing. In many cases, aluminum foil is incorporated into the film structure due to its excellent moisture and gas barrier properties, which help protect the sterility of the enclosed product. To achieve both sealing strength and easy opening, the film may be laminated, combining polymer layers for flexibility and heat-sealing capabilities with a metallic layer for added protection and durability.

The receptacle comprises a body which houses, in various embodiments, a battery connected electrically to a microcontroller configured to operate other components in the receptacle. In various embodiments the receptacle comprises additional novel components provided for the benefit of the user which include, in various combinations, a vibration mechanism 23 to assist with insertion of the sensor into the skin; a device to push the sensor into the skin; communication devices to allow the receptacle to communicate with an external device running a mobile app; and a charging coil 25 to receive power wirelessly from a charging station, and also to send power wirelessly to the battery in the biosensor.

FIG. 1A is a top down diagram of the invention 1 with the cap 3 in a closed position on the receptacle 3 and FIG. 1B is a side view diagram. FIG. 1C is an exploded side diagram of the invention with the cap 3 above the wearable sensor 5 and the receptacle 2 below.

Figures 2A, 2B, 2C:
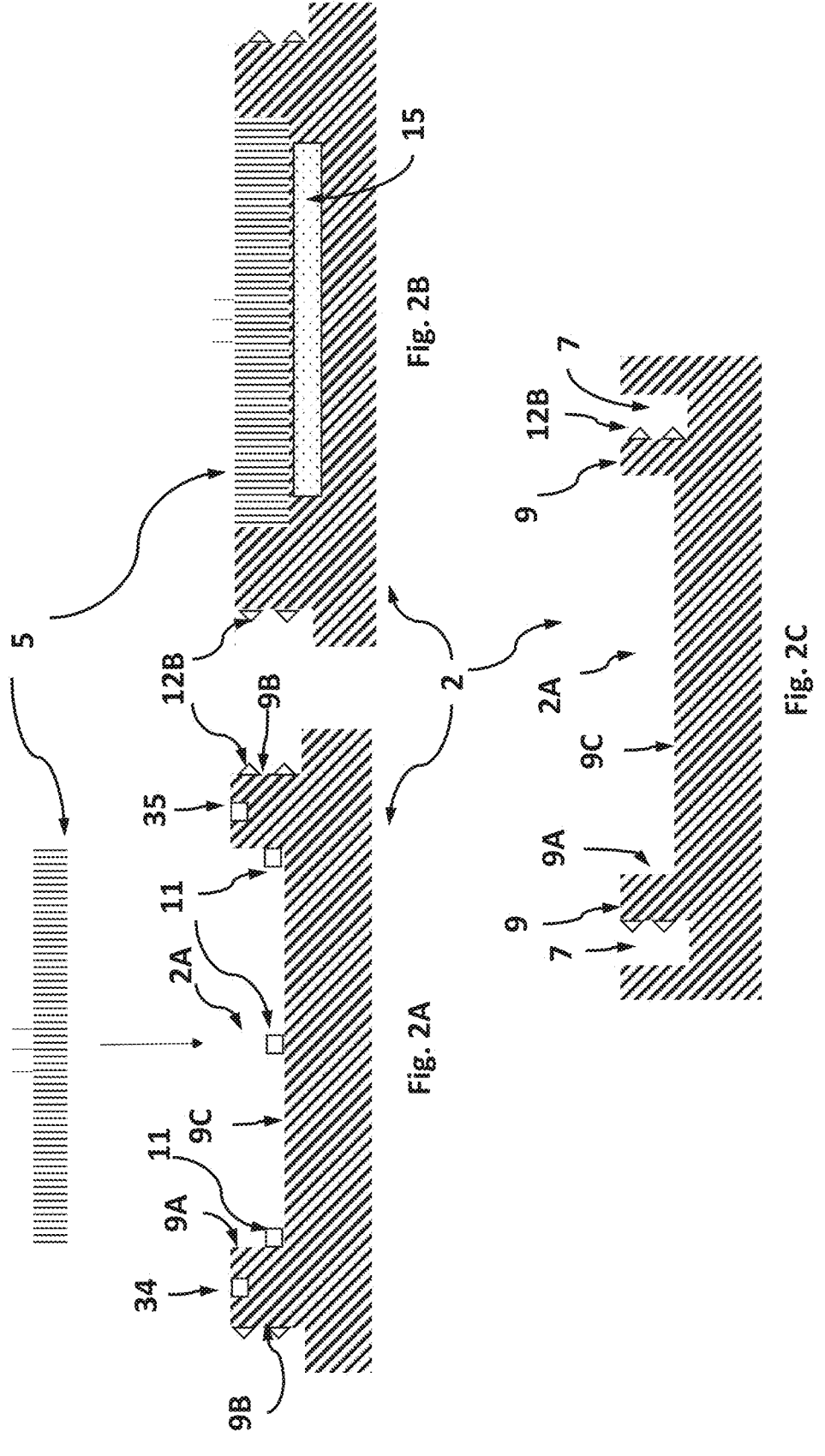
FIGS. 2A-2C are section views of the receptacle and the wearable biosensor.

FIG. 2A is a section view of the receptacle 2 with the wearable biosensor 5 positioned above the main compartment 2A defined by the at least one wall 9A and the bottom 9C. Holders 11 are in place on the at least one inner wall 9A and the bottom 9C to secure the biosensor in place. FIG. 2B is a section view of the wearable biosensor showing the biosensor seated in the main compartment in close proximity to a magnet 15. FIG. 2C is a section view of the receptacle showing a closure compartment 7 surrounding the main compartment. The closure compartment is defined by an outer wall 9B of the wall which, at the inner wall 9A, defines the main compartment Threads of the receptacle 12B are also shown in all three figures. Also shown are a skin conductance sensor 34 and a capacitance touch sensor 35 which may be located at the top of the receptacle's outer wall 9D so that they are in contact with the user's skin during insertion of the biosensor. The skin conductance sensor is an electrochemical system consisting of at least two electrodes positioned on the skin-contacting surface of the applicator. These electrodes detect changes in skin conductivity caused by variations in sweat gland activity and moisture levels, providing real-time physiological data. The capacitance touch sensor, on the other hand, operates by detecting changes in capacitance when the skin makes contact with the surface, allowing for precise user interaction or activation of the applicator system. Both the skin conductance sensor and the capacitance touch sensor are typically located on the upper part of the receptacle, as this is the primary area that contacts the user's skin during application. This placement ensures that the sensors maintain consistent and direct skin contact, optimizing signal accuracy and responsiveness.

Figures 3A, 3B, 3C:
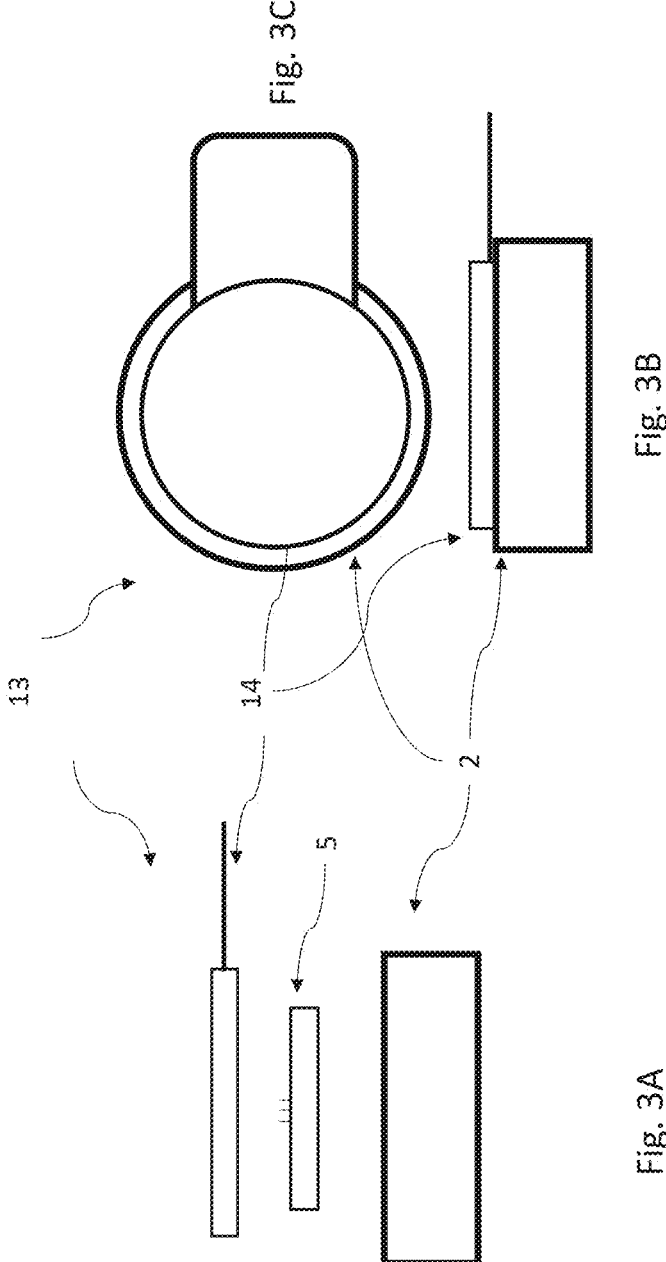
FIGS. 3A-3C are diagrams of an embodiment of the invention with a peelable film.

FIG. 3A is a side diagram having an exploded view of the receptacle 2, and wearable biosensor 5 and the peelable film 14. FIG. 3B is a side diagram of the invention in the embodiment with the receptacle 2 enclosed by a peelable film 14. FIG. 3C is a top down diagram of the receptacle enclosed by a peelable film.

Figure 4:
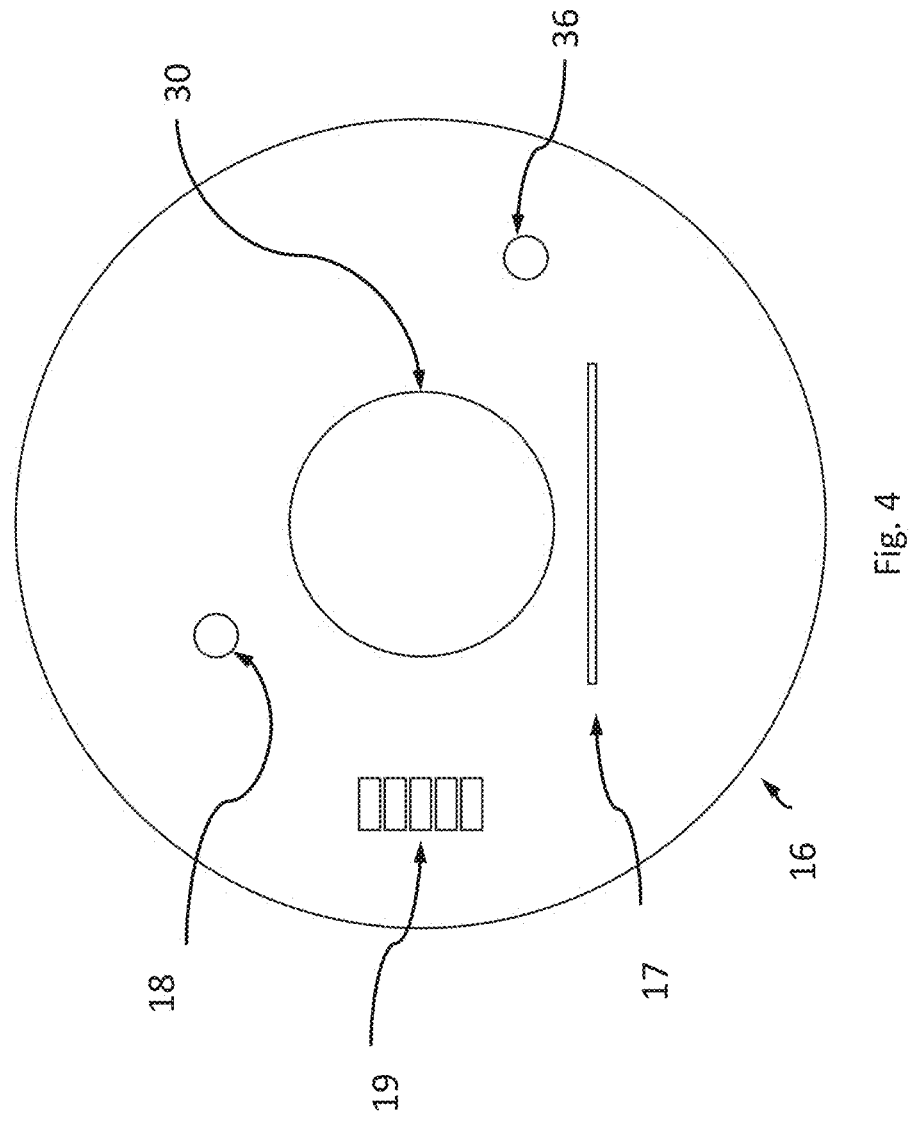
FIG. 4 is a diagram of one embodiment of the exterior of the bottom of the receptacle.

FIG. 4 is a diagram of the exterior surface 16 of one embodiment of the receptacle showing a speaker 17, an LED light 18, a battery level indicator 19 and a force touch sensor 30. There is also provided n activation switch 36 for different modalities such as waking the system up or running the steps for determining proper force application as in, for example, FIG. 7.

Figure 5:
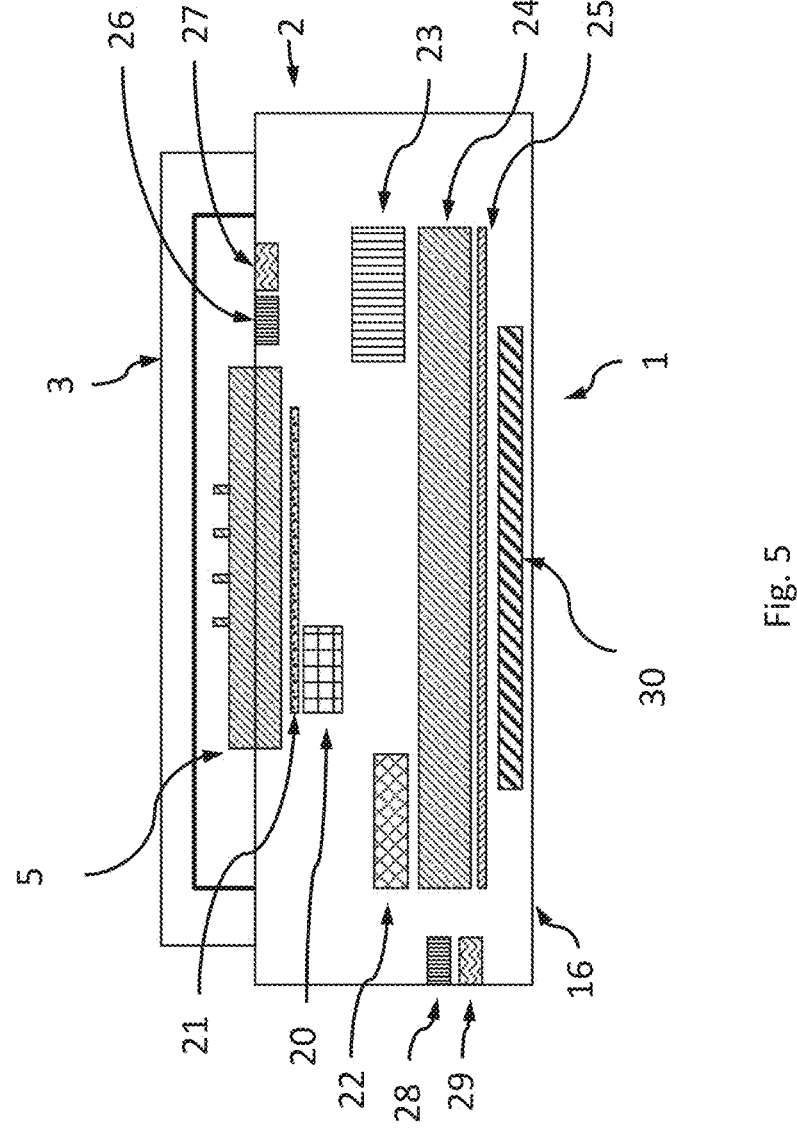
FIG. 5 is a diagram of one embodiment of the invention showing electrical components inside the receptacle and on its borders.

FIG. 5 is a side diagram of one embodiment of the invention with a receptacle 2 and a cap 3 enclosing a wearable biosensor 5. An actuator 20 and actuator plate 21 are for moving the wearable biosensor out of the main. The microcontroller 22 operates the electrical components such as the actuator and the vibration mechanism 23. The outside temperature sensor 28 and the outside humidity 29 open to the outside of the receptacle. The inside temperature sensor 26 and the inside humidity sensor 27 open to the inside of the space in which the top of the wearable sensor 5 is located.

The humidity sensors 27, 29 and temperature sensors 26, 28 continuously monitor environmental conditions and report their data to the microcontroller, which processes and stores this information, enabling real-time logging and historical tracking of the shipping and storage environment prior to the sensor's use. These sensors ensure that environmental fluctuations during transportation, warehousing, and handling are recorded, providing a complete profile of the conditions to which the wearable sensor has been exposed. The receptacle, in various embodiments, also integrates additional sensing capabilities, such as barometric pressure sensors or accelerometers, to detect shock, altitude changes, or mishandling during transit, further refining calibration accuracy. Upon activation, this data can be wirelessly transmitted via NFC or Bluetooth either directly to the accompanying mobile app or directly to the biosensor, ensuring seamless integration and calibration adjustments at or during the pairing process. The stored humidity and temperature data provide critical insights into potential environmental fluctuations that may impact sensor performance, ensuring the wearable sensor's baseline calibration is optimized for high-precision measurements. In some embodiments, the mobile app uses this data for automated calibration compensation, adjusting sensor response characteristics based on pre-exposure conditions to enhance accuracy. The receptacle also incorporates tamper-detection features, such as breakable conductive traces or digital authentication via NFC-based cryptographic identifiers, ensuring sensor authenticity verification before pairing. Additionally, this functionality enables quality assurance verification, alerting users or manufacturers to potential out-of-range shipping or storage conditions that may compromise sensor efficacy. The system may be powered by an embedded battery or wirelessly charged via NFC or inductive power transfer, allowing for low-power operation and long's readings once applied to the body.

The invention enables better placement of the microprobe array. The user positions the receptacle, which is holding the biosensor, on the skin and aids the user in insertion. The receptacle comprises a force touch sensor 30 and feedback indicator such as the speaker 17 or LED light 18 which guide the user in applying an adequate amount of pressure (force) onto the wearable biosensor to ensure proper insertion of the microprobes and provide real-time feedback. The feedback is indicated by means of notifications selected from the group consisting of vibrations, sounds, flashing lights on the wearable device and notification through Bluetooth or similar signals to a mobile device containing an app.

The force touch sensor is configured to measure force applied during insertion of the microprobe array into the skin of a user. The force touch sensor connects electrically to the microcontroller which is connected to a feedback indicator configured to provide to the user a notification of the amount of force applied (just right, too much or too little force) during insertion.

The force touch sensor may be selected from the group consisting of a sensor for pressure, strain, piezoelectric, piezoresistive, resonant, electromagnetic, capacitive, and diaphragm-based MEMS sensors operating individually or in combination with each other, and the force touch sensor is configured to transduce an applied force into an electrical parameter selected from the group consisting of resistance, current, capacitance, inductance, frequency or phase shift, voltage variability, optical or thermal changes and magnetic field variations.

The feedback indicator comprises a physical or virtual device configured to generate a notification selected from the group consisting of an audio speaker including a MEMS speaker, a vibration mechanism, and a light-emitting diode (LED) on the wearable device and a notification through Bluetooth or similar signals to a mobile device containing an app.

The force touch sensor is integrated into the body of the receptacle and translates the force on the receptacle during insertion to a measurable signal. The force touch sensor in different embodiments is selected from the group consisting of pressure, strain gauge, piezoelectric, piezoresistive, resonant, electromagnetic, capacitive, diaphragm-based MEMS sensors, or optical sensors, all of these operating individually or in combination with each other.

Figure 6:
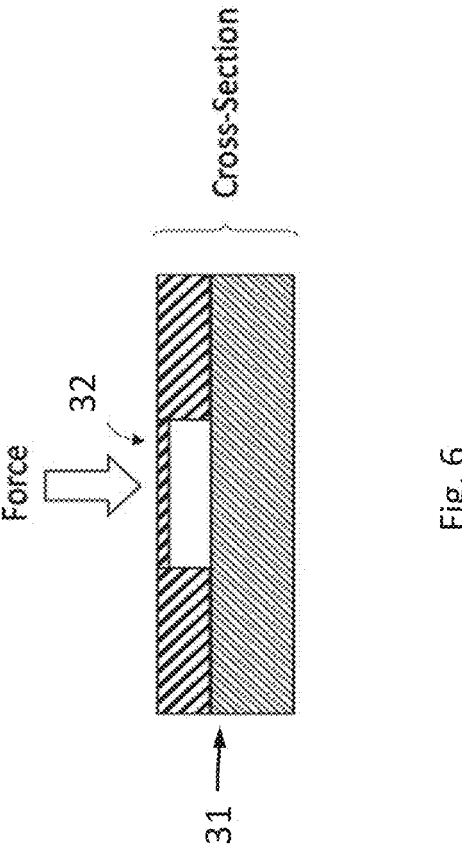
FIG. 6 is a section view of a micro-electro-mechanical system (MEMS) pressure sensor.

Interplay between the force touch sensor and feedback indicator and the "mode" of user interaction can be realized in various ways. As shown in FIG. 6, the force touch sensor may be a two component resistance-based pressure sensor positioned in the body of the receptacle, such as a Micro-Electro-Mechanical Systems (MEMS) pressure sensor 31 (e.g., capacitive pressure sensor). The receptacle may be at least partially formed from a semiconductor (e.g., silicon) substrate and include various material layers applied and shaped using various suitable microelectromechanical systems (MEMS) manufacturing techniques (e.g., deposition and etching techniques) known in the art. Suitable configurations for the MEMS device described herein are found in US patent publication number US20220031209A1. The MEMS pressure sensor 31 in this embodiment is distinguished by a diaphragm 32 crafted from silicon or a similarly behaving material. This diaphragm, shown in the callout to the right, is meticulously calibrated to deform within a specific pressure range, precisely from 1 Newton (N) to 50 Newtons (N). The design ensures that the sensitivity of the diaphragm is finely tuned, inversely correlating with its dimensional proportions. Upon application of the microneedle array to a patient's skin, and subsequent exertion of pressure, the MEMS pressure sensor 31 is activated. The diaphragm 32 deforms responsively, influencing the piezoresistive elements that are integrally embedded within it. These elements, highly sensitive to deformation, undergo a change in electrical resistance that directly corresponds to the magnitude of the applied pressure. This change is accurately captured and processed by the embedded electrical circuitry, such as the Wheatstone bridge network, described further herein, which is specifically configured to amplify and refine the signal for enhanced precision. The Wheatstone bridge, a fundamental circuit in pressure sensing applications, is adept at precisely measuring minute changes in resistance, making it ideal for translating the mechanical deformations of the diaphragm into reliable electrical signals. Subsequently, the processed signal is transmitted to the signal processing unit, where it undergoes a transformation from an analog to a digital format.

Figure 7:
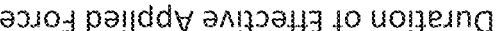
FIG. 7 is a diagram depicting one method for using the force touch sensor of the invention.
Figure 7:
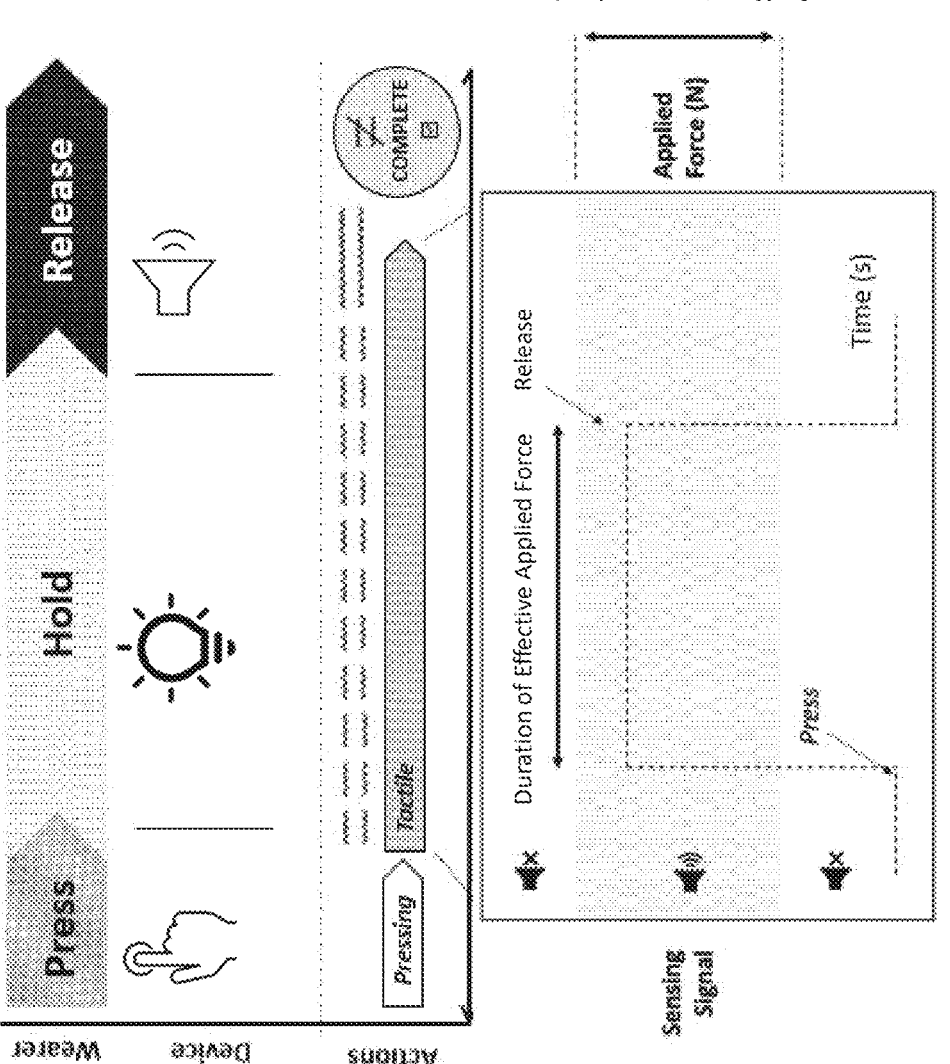

FIG. 7 depicts one embodiment of a method for using the force touch sensor 30 of the device. The diagram shows a basic mode of press/hold/release phases with the corresponding exemplary graph of a pressure sensor and duration and magnitude of the applied force using a pressure sensor as the force touch sensor, and a speaker emitting a sound such as a beep. Crossed-out text represents other embodiments to create better placement using different touch sensors and feedback indicators which can operate simultaneously or individually. FIG. 4 depicts the feedback indicator in an embodiment as a micro speaker 17. Here, the user applies the sensor 5 to her skin and presses an activation switch 36 on the exterior of the bottom of the receptacle with the biosensor facing the skin. Upon applying the pressure, the micro speaker begins providing feedback in the form of beeping to guide the applied pressure in magnitude and duration. In one embodiment, a 0.5 second on/0.5 second off beeping regime occurs when the user applies a "correct" magnitude of force to the device and continues for 6 seconds to guide the duration, after which a continuous beep (a single tone for 3 seconds followed by muting) is emitted to indicate that the microneedles have been inserted correctly and the application process is complete. In one embodiment, a correct magnitude of force is within a range of 5-50 newtons and in another embodiment 15-35 newtons. Pauses in beeping can indicate insufficient magnitude and therefore the need to reposition the device. All beeping (or any other feedback) occurs in real-time.

The receptacle serves as an intelligent electronic system, integrating electronic hardware, embedded software, sensors, and communication interfaces, operating independently from the microprobe/microneedle sensor. It autonomously validates and logs critical parameters, such as:

1. Package Integrity Monitoring—A mechanism to detect and confirm when the package has been opened, ensuring product integrity.

2. Environmental Condition Logging—Embedded temperature and humidity sensors continuously track and store environmental data throughout shipping, storage, and immediately before and after application to the body. The package records time-stamped environmental conditions for quality assurance.

3. Skin Contact Detection and Pressure Profiling—Integrated touch sensors (e.g., pressure sensors, skin conductance sensors, and capacitive touch sensors) enable real-time monitoring of skin contact events. Upon contact, the system registers:
   Moment t0(zero): Initial skin contact detected.
   Moment t0(zero)+td [ms]: Pressure build-up over time, generating a pressure-over-time profile that allows precise detection of application duration and removal events.
   Skin conductance changes are logged to confirm proper adhesion and physiological interaction with the user.

Figure 8:
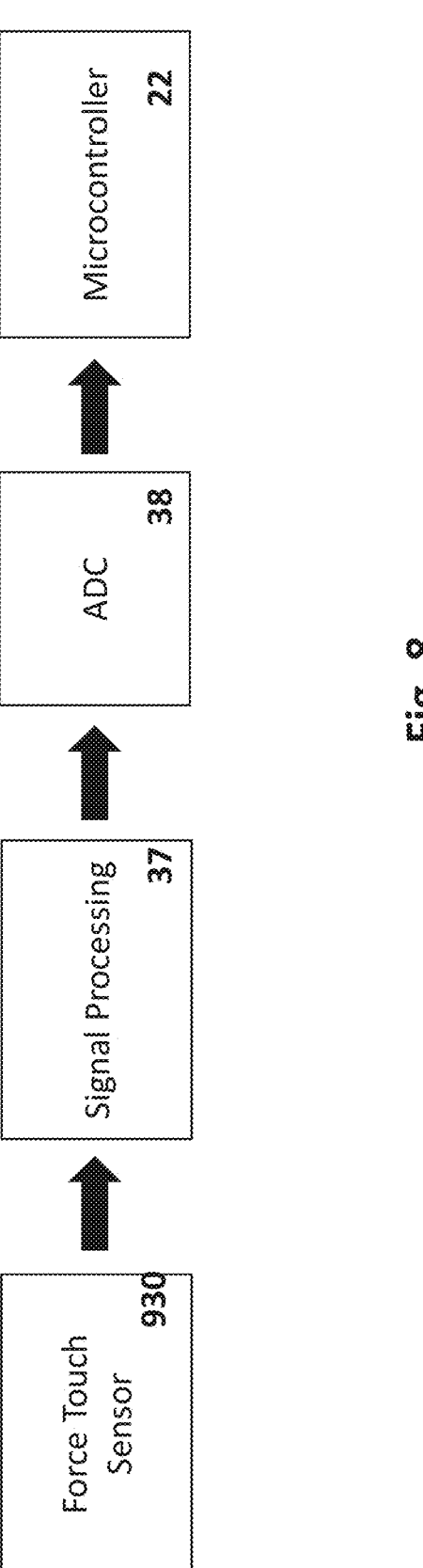
FIG. 8 is a block diagram of one embodiment of the system for acquiring and processing data with the force touch sensor.

4. Force Touch Sensor Data Acquisition and Processing—The package integrates force touch sensing for pressure measurement. One embodiment of the system, depicted in FIG. 8, consists of:
   A force touch (pressure) sensor (30) for detecting applied force.
   Signal processing circuitry (37) that conditions the raw sensor signal.
   An analog-to-digital converter (ADC) (38) for quantization and digitization.
   A microcontroller (22) that interprets and processes the acquired data.
   In various embodiments, the signal processing circuitry provides signal conversion, such as transimpedance (current-to-voltage) conversion, pass-band filtering, and signal amplification, optimizing the signal for acquisition by the ADC while maintaining a high signal-to-noise ratio (SNR). The ADC may support single-ended or differential input configurations.
   The microcontroller applies algorithms or mathematical transformations to interpret ADC output, converting raw quantized data into meaningful values representative of the applied force. Additional digital signal processing (DSP) circuitry, such as a cascaded integrator-comb (CIC) filter, may be employed post-digitization to further enhance signal clarity and SNR.

5. Wireless Communication and Data Exchange—The package facilitates bi-directional communication via NFC and Bluetooth:
   Bluetooth/NFC communication with a mobile device (iPhone/Android): The package transmits historical environmental data (e.g., storage conditions, humidity, temperature), pressure profiles, and skin conductance logs to the mobile device in real time.
   Direct NFC/Bluetooth communication with the microprobe/microneedle sensor: Enables periodic or on-demand data exchange between the package and the sensor, ensuring synchronization of operational parameters and diagnostics.

6. Embedded Electronics—The package features dedicated electronic hardware that comprise:
   Microcontroller for signal processing
   Analog-to-digital converter(s) for sensor data acquisition
   Potentiostat for electrochemical measurements
   Wireless communication circuits (NFC/Bluetooth Low Energy (BLE)).

8

Onboard memory/storage to log historical environmental and physiological data.

The integrated architecture herein ensures that the receptacle functions as a self-monitoring, sensor-enhanced system, capable of validating product integrity, tracking environmental conditions, and seamlessly exchanging data with the microprobe sensor and the user's device through wireless transmission.

Figure 9:
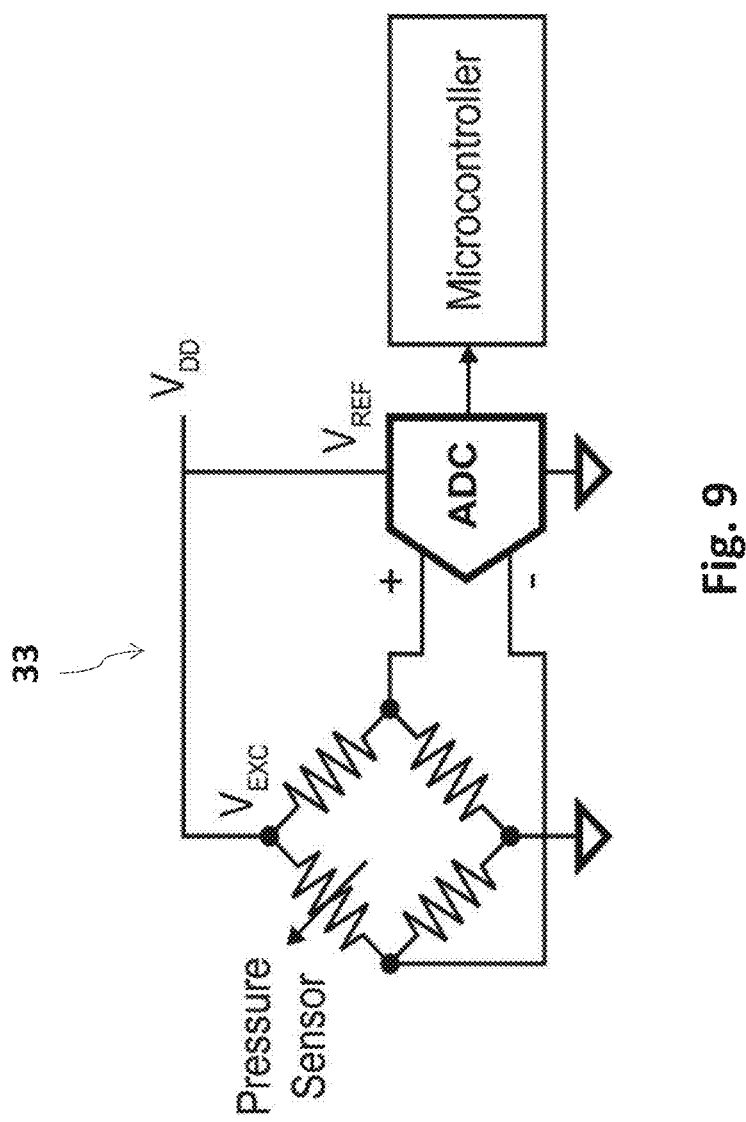
FIG. 9 is a schematic for one embodiment of a Wheatstone Bridge circuit for use in data acquisition or the force touch sensor.

One embodiment of the circuit implementation of the force touch sensor data measurement capability is depicted in FIG. 9. Here, the force touch sensor 1 is represented as a sensor whose resistance is sensitive to applied force, such as a force sensing resistor (FSR), which exhibits a decrease in presented resistance in response to increase in applied force. A Wheatstone Bridge circuit 33 is employed to convert a resistance change into a voltage change, which can then be acquired (quantized/digitized) by the analog-to-digital converter (ADC). The supply voltage, VDD, is used as both the excitation voltage (VEXC) for the Wheatstone bridge and the ADC reference voltage (VREF), which keeps the Wheatstone bridge common-mode voltage output always within the common-mode input range of the ADC. In certain embodiments, power to the Wheatstone Bridge and the ADC can be duty cycled to limit power consumption. In this embodiment, the differential output of the Wheatstone bridge is measured by a differential ADC. The ADC quantizes this differential voltage and provides a bit stream of quantized data to the microcontroller through a digital bus. The microcontroller performs a mathematical transformation on the bit-stream and converts it into an integer value of the applied force.

A schematic of one embodiment of a skin-insertion force reduction capability herein utilizes a force touch sensor and a vibration mechanism in order to translate force applied by the user into electronically-controlled vibration of the microneedle electrode(s) to lower the minimum force required for reliable/repeatable microneedle electrode insertion into the epidermis. Minimizing force applied to the skin 1) localizes and minimizes damage to the surrounding skin tissue, 2) minimizes local inflammatory response and resultant biofouling, and 3) improves short-term response (reduced "warm-up" period duration) and 4) improves the long-term stability of the sensor within the skin.

The force touch sensor is integrated into the receptacle. The force touch sensor can be strain, piezoelectric, or capacitive in nature (among other types described herein) which transduces an applied force into an electrical parameter selected from the group consisting of resistance, impedance, potential, current, capacitance, inductance, frequency or phase shift, voltage variability, optical or thermal changes and magnetic field variations.

The feedback indicator, e.g., vibration mechanism, is electrically connected to the electronics unit such as a PCB in the body of the receptacle. This allows the vibration mechanism, when mechanically bonded to the PCB, to be mechanically coupled to the microneedle array. In various embodiments, force applied onto the force touch sensor can modulate the vibration mechanism driving signal, therefore modulating vibration characteristics. The driving signal of the vibration mechanism is selected from the group consisting of amplitude, frequency, and on/off keying. A combination of these types can also be used. The force touch sensor output can be filtered such that there is no feedback interference caused by vibration mechanism while acquiring force-touch data.

Figure 10:
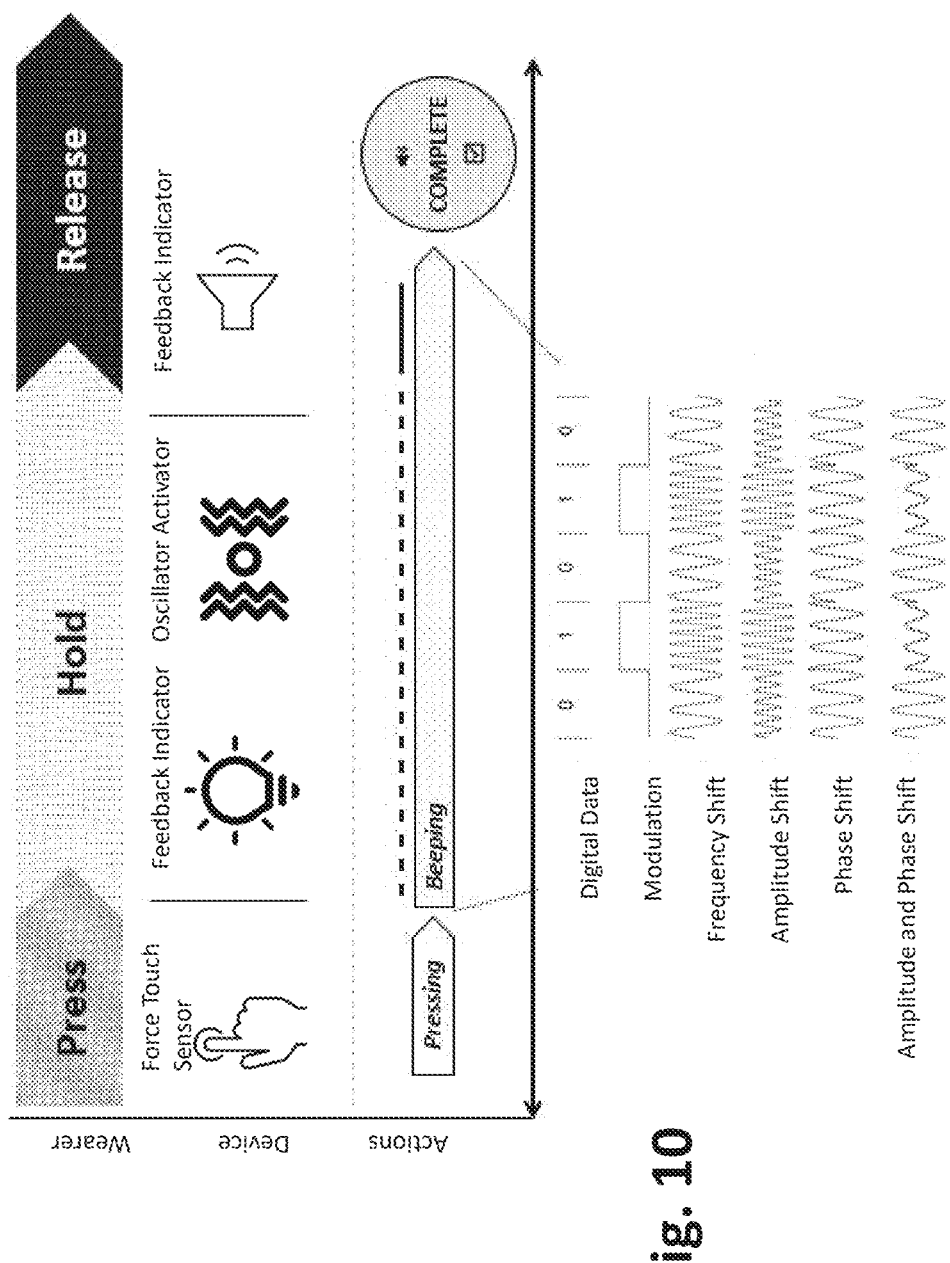
FIG. 10 is a diagram depicting one embodiment of a skin-insertion force reduction aspect of the system.

The force touch sensor and vibration mechanism, the interplay between the devices, and an operation mode for user interaction can be used in various ways. The following describes an embodiment of the operation mode for this device. The sensor can be a two-component resistance-based pressure sensor with one component placed behind the microneedle array and another on the PCB (as in FIG. 1a), and a tactile haptic-based oscillation/resonance actuator in a PCB-mounted resonance-utilizing vibration device electrically connected to the PCB. The oscillation/resistance actuator is selected from the group consisting of linear, rotary and tactile haptic. The user applies the sensor on her skin and presses the back end of the device with the microneedle tips facing the skin. Upon applying the pressure, the actuator begins to resonate with a predefined frequency, magnitude and modulation appropriate for low-force insertion of the microneedle tips through the skin. FIG. 10 depicts a skin-insertion force reduction aspect of the system, with the diagram showing a basic mode of press/hold/release phases with the corresponding exemplary graph of the pressure sensor duration the magnitude and duration of the applied force. Crossed-out text indicates other modules which can be activated and be operational simultaneously, or individually in the above embodiment.

Figures 11, 12:
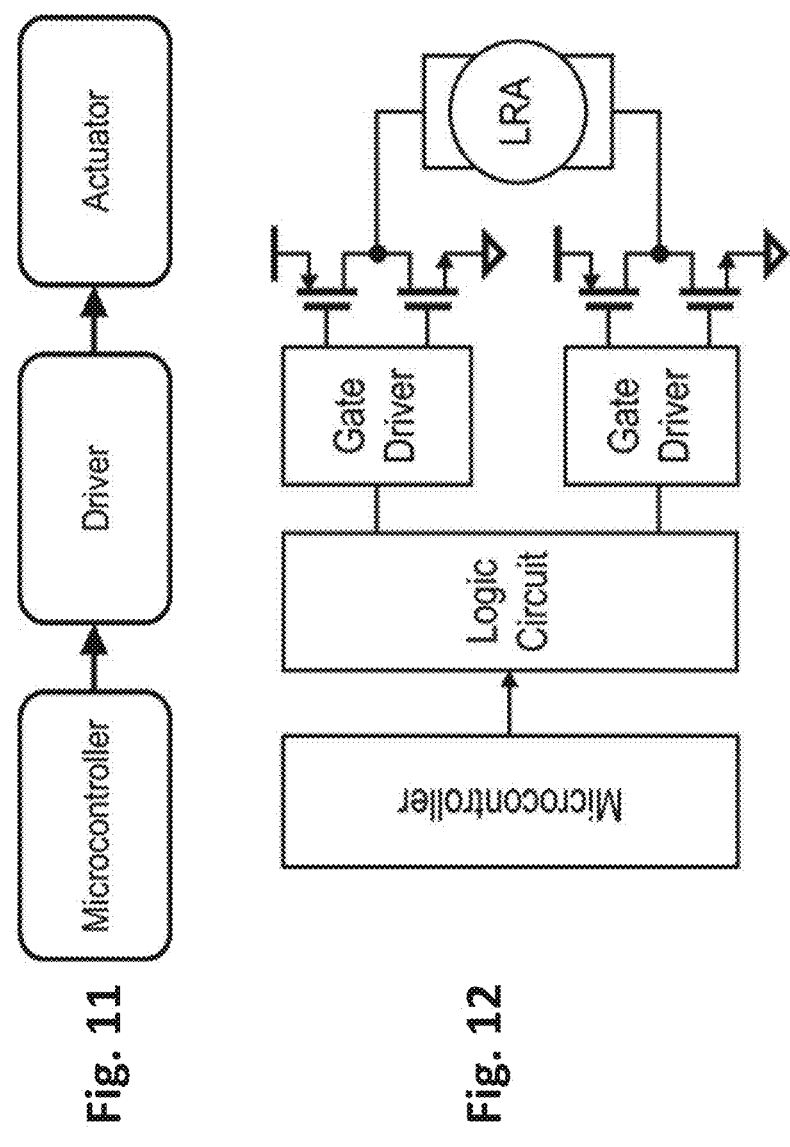
FIG. 11 is a block diagram of one embodiment of the vibration mechanism control system.
FIG. 12 is one embodiment of a circuit for the vibration mechanism control system.

A functional block diagram of the vibration mechanism control system is depicted in FIG. 11. It comprises a microcontroller, an actuator driver, and an actuator that produces vibration of the device.

The actuator driver outputs a signal whose fundamental frequency is within the operational range of the actuator to cause the vibratory motion of the actuator. The actuator driver, in part, provides amplification to its input signal (from the microcontroller) to provide sufficient current and voltage to cause the actuator to vibrate at the desired magnitude. The actuator driver circuitry may include filtering or employ waveform engineering (e.g., leveraging nonlinear characteristics of active components) to produce the desired signal at the actuator's input.

An example circuit implementation of the vibration mechanism control system is depicted in FIG. 12. In one embodiment, the vibration mechanism is implemented with a linear resonant actuator (LRA), and the actuator driver is implemented with a class D amplifier which comprises a logic circuit, gate drivers, and output transistors and which operates via pulse-width-modulation (PWM). The microcontroller communicates with the logic circuit (over a digital bus) the desired amplitude of the driver output signal. The logic circuit creates a corresponding PWM signal applied to the switching transistors via gate drivers to ultimately drive the LRA at the desired amplitude at the actuator's resonant frequency.

The receptacle comprises a battery that enables wireless recharging of the biosensor to operate the sensor while it is applied to the body. Wireless power transfer methods include near-field communication (NFC) or inductive charging, tailored for medical devices. The embedded battery may be recharged externally, ensuring the biosensor remains operational for extended periods without needing to be removed for charging, enhancing user convenience and device longevity. The receptacle includes an integrated battery and features an NFC coil or multiple NFC coils for wireless power transfer. It is equipped with a USB port (e.g., Mini-USB, USB-C) for direct wired charging. The NFC coil(s) enable wireless charging via an external charging station and can also wirelessly transfer power to a sensor positioned on the receptacle. The system supports both wired and wireless charging modes, ensuring efficient power delivery to internal and external components.

In various embodiments the receptacle comprises a vibration mechanism to assist the sensor's probes or other filaments to pierce the skin. Vibration mechanisms are selected from the group consisting of an eccentric rotating mass actuator (ERM), a linear resonant actuator (LRA), a piezoelectric actuator, electroactive polymers (EAPs), microelectromechanical systems (MEMS), a tactile haptic-based oscillation/resonance actuator and a voice coil actuator.

The receptacle detects skin contact by means of the force touch sensor connected to the microcontroller which then modulates the frequency generated by the vibration mechanism. The amount of pressure from the skin is computed in real time to accommodate different skin types and thicknesses, and to modulate the vibration frequency. The vibration frequency can be uniform vibration or short, sequenced pulses. Prior to insertion of the probes, the vibration can also be used to pre-condition the skin to minimize discomfort and reduce tissue trauma by gradual (instead of rapid) insertion allowing the elastic skin tissue to deform more gently than tearing abruptly. Tissue damage can reduce the effectiveness of the wearable biosensor, i.e., by the inflammatory response in the skin near the microprobes.

The force for insertion can be regulated intelligently with feedback from haptics, audio, and light. In various embodiments the receptacle comprises an embedded speaker/LED/haptic indicator which guides proper application force. For adaptive haptic feedback, while the user is holding the receptacle with the wearable biosensor in it prior to insertion, a haptic actuator provides gentle taps or pulses to the user's finger or wrist, indicating when the applied force is approaching or exceeding the ideal threshold. The ideal threshold is approximately 0.3-0.6 N, which is sufficient to ensure microprobe penetration into the skin while minimizing pain and tissue damage. An LED indicator can be a single color or a color-changing array (e.g., green-to-red gradient) which offers an intuitive visual guide for how much pressure is being exerted. To guide the user, audio coaching cues can be nonverbal tones or brief spoken prompts ("A little more pressure," "That's perfect," "Reduce pressure now"). These devices and methods collectively enhance user confidence and consistency in sensor application.

The invention in various embodiments comprises a controlled insertion system with an electronically empowered mechanism to push microprobes into the wearer's skin. This system aims to improve user comfort, reduce skin trauma, reduce error in manual application, and enhance sensor accuracy and safety. While prior art approaches often rely on spring-loaded mechanical applicators to insert the probe(s) rapidly, an electronically controlled forcing system can automate the insertion process to (1) insure reproducible insertion depths and angles, (2) minimize potential tissue trauma by distributing force evenly, and (3) offer a more user-friendly experience, particularly for individuals with dexterity or strength limitations.

The forcing system in one embodiment comprises a miniature linear actuator or stepper motor mechanism in the receptacle. A compact linear actuator, housed within the receptacle, extends and retracts the microprobe array at a predetermined force and speed. The actuator may be powered by a small battery or capacitor whose charge is replenished via wireless charging (NFC, Qi, or similar). Another embodiment incorporates a micro stepper motor which regulates the depth of penetration by controlling the rotation count. Each "step" correlates to a minute advancement in microprobe insertion, allowing for fine-grained control of how deep the probes go. A built-in force touch sensor continuously monitors the contact force. If resistance exceeds a safe threshold (e.g., hitting thick scar tissue), the motor automatically halts or retracts to prevent injury.

In another embodiment of the forcing system, in the receptacle a pneumatic pump inflates a micro-cylinder which applies controlled pressure on the wearable sensor, gently pushing the microprobes into the skin. Once the target penetration depth is reached (verified by sensors such as the force touch sensor and the skin conductance sensor embedded in the wearable sensor), the pump stops or slightly deflates to stabilize the patch. The pump is configured so that real-time pressure data from the force touch sensor in the receptacle can signal the pump to modulate airflow, maintaining the ideal insertion pressure range without user intervention.

An electromagnetic drive system is another embodiment of the forcing system. Therein an integrated solenoid coil is configured so that, when energized, it exerts a precise linear force on the microprobes. The current supplied to the coil (and thus force output) can be tuned via the built-in microcontroller. This produces a soft start/stop mechanism: advanced drive electronics create a smooth acceleration and deceleration profile, preventing abrupt probe penetration and improving comfort.

Safety and comfort enhancements are configured in the invention in several ways. Adaptive control algorithms can include (1) proportional-integral-derivative (PID) control or similar advanced control algorithms to balance insertion speed and force, ensuring minimal overshoot (too deep) or undershoot (not deep enough), and (2) skin/impedance detection by measuring electrical impedance or mechanical resistance at the probe tip so that the microcontroller can dynamically adjust insertion parameters to match the individual's skin thickness. Fail-safe lock and emergency retraction can include (a) mechanical locking so that, if power is lost or an emergency stop is triggered, a mechanical lock halts the microprobe platform to prevent accidental deeper insertion, or (b) sensor error protocol so that, if the sensor detects an abnormal insertion trajectory or excessive force, the system triggers an immediate partial or full retraction to protect the user. User-controlled modes include (i) manual override so that, though the system is electronically driven, a simple manual override allows the user or healthcare professional to retract the microprobes in emergencies, or (ii) gentle mode vs. fast mode, so that users can select from different insertion profiles-"gentle" for first-time or highly sensitive users, and "fast" for more experienced wearers comfortable with quicker probe penetration.

The invention allows integration among the different System Features. Synchronization with Vibration and Haptic Feedback allows the electronically controlled forcing system to work hand-in-hand with the vibration mechanism. During insertion, the receptacle can engage gentle vibrations to distract pain receptors and minimize discomfort. Haptic feedback can confirm that insertion is proceeding as intended, reducing anxiety and user error. Real-Time Audio & Visual Guides allow LEDs or a color-coded display to track the actuator's progress, reassuring the user that insertion is happening at a safe, measured pace. A built-in speaker provides short verbal or tonal notifications ("Insertion beginning," "Insertion complete," "Retracting probes") to keep the wearer informed.

Advanced data logging and IoT connectivity. The actuating controller can store data on insertion metrics (force, speed, duration) and transmit them wirelessly to a companion app or cloud service for record-keeping and analysis. Over time, machine learning algorithms can refine the insertion profile based on user feedback and sensor performance, personalizing the experience for each wearer.

Environmental sensing integration is achieved through (1) thermal compensation whereby the temperature sensor calibrates the microprobe data, ensuring that readings (e.g., alcohol, glucose, lactate) remain accurate in varying climates and (2) ambient light sensor: when optical sensors (e.g., for measuring oxygenation in the interstitial fluid) are included, an ambient light sensor helps correct for external lighting conditions to maintain sensor accuracy.

A dynamic probe length and retraction mechanism comprises a shape memory alloy (SMA) or micro-actuated microprobe system that: (a) calibrates penetration depth by automatically adjusting microprobe protrusion based on the individual's skin thickness or real-time sensor readings of fluid flow, (b) retracts upon error or completion if the system detects abnormal insertion (too much force, incorrect angle) or the monitoring period ends, it can fully or partially retract the microprobes. Retraction like this safeguards against prolonged tissue damage or accidental bumps that might cause discomfort.

Wireless power & communication interface has many advantages: (1) near-field communication (NFC) charging for quick wireless top-ups of the sensor battery or capacitive storage, minimizing battery size, (2) multi-band antenna supports Bluetooth low energy, NFC, or even 5G for fast data transfer to smartphones, smartwatches, or clinical monitoring systems, and (3) Encrypted Data Transmission ensures user data privacy and security at all times.

To protect the wearable sensor from moisture, contaminants, and environmental exposure, the receptacle and cap can be designed to form a secure, airtight, and watertight seal using various mechanical and adhesive-based sealing techniques such as:

1. Threaded Screw-On Seal (Threaded Coupling)
   A male-threaded portion on the receptacle and a female-threaded cap interlock to create a mechanical screw-on seal.
   The threads may incorporate a gasket (e.g., silicone O-ring) or elastomeric seal to improve waterproofing.
   enclosure requires a secure but removable connection.
2. Press-Fit or Snap-Fit Seal (Friction Fit/Interference Fit)
   The cap is designed to press tightly into the receptacle, forming a compression seal that holds the two components together through mechanical friction.
   The components for the friction fit are selected from the group consisting of micro-ridges, protrusions, u-shaped channels, beads or a locking groove to provide tight seal, enhance grip and prevent accidental detachment. These friction fit structures may be used in several combinations.
3. Ultrasonic Welding or Heat Sealing
   The cap and receptacle are permanently fused together using ultrasonic vibrations or thermal bonding, creating a single-piece, hermetically sealed enclosure.
   This method ensures complete water and air impermeability, making it suitable for disposable sensor applications where removal is unnecessary.
4. Adhesive Bonding (Chemical Sealing)
   A medical-grade adhesive or epoxy is applied between the cap and receptacle, creating a chemical bond that forms a permanent seal.
   This method is ideal for single-use disposable enclosures, where reopening is not required.

5. Twist-Lock Mechanism (Bayonet Locking)

A twist-lock system where the cap engages with the receptacle through bayonet-style interlocking grooves.

The user aligns the cap and twists it into a locked position, forming an airtight and watertight barrier.

6. Magnetic Sealing with Elastomeric Gasket

Small embedded magnets in both the cap and receptacle create a secure, guided closure, while a soft elastomeric gasket (e.g., silicone or TPU) ensures airtight and watertight properties.

This method provides a smooth user experience with quick access and resealing.

7. Latching Clip or Hinged Locking Mechanism

A snap-latch system where the cap and receptacle lock together through a small mechanical hinge and latch.

This ensures a tight seal, often supplemented with rubberized or silicone gaskets for waterproofing.

8. Vacuum-Sealed or Pressure-Sealed Closure

A low-pressure vacuum chamber is formed when sealing the cap onto the receptacle, preventing external air or liquid infiltration.

This is often combined with a flexible gasket or a polymer-based airtight membrane for enhanced protection.

The invention herein is a packaging system for a wearable biosensor comprising a receptacle comprising a bottom, a body and a main compartment opening upwardly and defined by at least one wall and the bottom and configured to hold a wearable biosensor in a secure position, the at least one wall comprising an inner surface, the receptacle further comprising a raised perimeter comprising a top, and a peelable film sealed to the top of the receptacle, and wherein the body of the receptacle comprises electrical components of a battery, a microcontroller, a force touch sensor and a feedback indicator and wherein the electrical components are connected electrically, so that a user of the receptacle, after opening the peelable film, can use the receptacle for insertion of the wearable biosensor into the skin and receive feedback on the insertion from the force touch sensor. In various embodiments 13 a cap is provided instead of the peelable film, and the cap is secured to the receptacle by a closure mechanism selected from the group consisting of threads placed in complementary positions in the cap (not shown) and the receptacle (12B), and components for producing a friction fit components selected from the group consisting of micro-ridges, protrusions, U-shaped channels, beads or a locking groove Embodiments with the complementary threads are circular/cylindrical and the embodiments with a friction fit closure may be circular/cylindrical or any other shape including, without limitation, a rectangular prism. In various embodiments with the cap the closure mechanism may be on the exterior of the cap and receptacle, or they may be contained within a closure compartment surrounding the main compartment.

The force touch sensor in the receptacle is selected from the group consisting of pressure, strain gauge, piezoresistive, resonant, electromagnetic, capacitive, and diaphragm based MEMS sensors operating individually or in combination with each other. The force touch sensor is configured to transduce an applied force into an electrical parameter selected from the group consisting of resistance, current, capacitance, inductance, frequency or phase shift, voltage, optical or thermal changes and magnetic field variations.

The receptacle in various embodiments may comprise a magnet positioned inside the main compartment and configured to hold the wearable biosensor in the secure position.

In various embodiments the body of the receptacle further comprises at least one antenna configured to support communication protocols to the wearable biosensor and to an external device selected from the group consisting of Bluetooth low energy, NFC or 5G, and wherein the external device is configured to run a mobile app also communicating with the wearable biosensor.

The receptacle in various embodiments may also comprise a charging coil 25 configured to receive and send power from an external power source, recharge the battery 24 in the receptacle, and recharge a battery in the biosensor.

In various embodiments the feedback indicator comprises a physical or virtual device selected from the group consisting of an audio speaker including a microelectromechanical system (MEMS) speaker, a vibration mechanism, and a light-emitting diode (LED) on the wearable device and a notification through Bluetooth or similar signals to a mobile device containing an app. The vibration mechanism may be configured to assist with insertion of the wearable biosensor into skin and to provide feedback to the user during insertion. The vibration mechanism is selected from the group consisting of an eccentric rotating mass actuator (ERM), a linear resonant actuator (LRA), a piezoelectric actuator, electroactive polymers (EAPs), microelectromechanical systems (MEMS), a tactile haptic-based oscillation/resonance actuator and a voice coil actuator. A driving signal of the vibration mechanism is selected from the group consisting of amplitude, frequency and on/off keying.

In various embodiments the feedback indicator is configured to provide a notification selected from the group of a sound, a light, a vibration or a message delivered to the app on the mobile device.

In various embodiments the body of the receptacle further comprises a device configured to push the wearable biosensor into the skin and the device is selected from the group consisting of a force actuator, a spring, a pneumatic pump and a solenoid coil.

In various embodiments the microcontroller is equipped with safety and control enhancement modes which are selected from the group consisting of adaptive control algorithms, fail safe lock and retraction, and user control modes. The adaptive control algorithms are selected from the group consisting of proportional-integrative-derivative (PID) control and skin impedance detection; the failsafe lock and retraction mode is selected from the group consisting of mechanical locking and sensor error protocol, and the user control mode is selected from the group consisting of manual override and gentle versus fast mode.

In various embodiments there are holders positioned on the inner surface of the at least one wall configured to fix the wearable biosensor in the secure position. The holders may be flexible and configured to absorb force, or they may be relatively more rigid. In various embodiments at least one additional of the holders on the bottom of the main compartment.

Additional sensors may be provided in various embodiments in or on the receptacle including, without limitation, an inside and an outside humidity sensor; an inside and an outside temperature sensor; at least one skin conductance sensor and at least one capacitance touch sensor.

We claim:

1. A packaging system for a wearable biosensor comprising a receptacle comprising a bottom, a body and a main compartment opening upwardly and defined by at least one wall and the bottom and configured to hold a wearable biosensor in a secure position on skin of a user, the at least one wall comprising an inner surface, the receptacle further comprising a raised perimeter comprising a top with a force touch sensor comprising at least one capacitance touch, skin conductance or resistance sensor, a feedback indicator comprising a vibration mechanism configured to assist with insertion of the wearable biosensor into the skin and to provide feedback to the user during the insertion and a peelable film sealed to the top of the receptacle, and wherein the body of the receptacle comprises electrical components of a battery, a microcontroller, and wherein the electrical components are connected electrically, so that the user of the receptacle, after opening the peelable film, can use the receptacle for insertion of the wearable biosensor into the user's skin and receive feedback on the insertion from the force touch sensor.

2. The device of claim 1 wherein the force touch sensor is selected from the group consisting of pressure, strain gauge, piezoresistive, resonant, electromagnetic, and diaphragm based MEMS sensors operating individually or in combination with each other.

3. The device of claim 2 wherein the force touch sensor is configured to transduce an applied force into an electrical parameter selected from the group consisting of resistance, current, capacitance, inductance, frequency or phase shift, voltage, optical or thermal changes and magnetic field variations.

4. The packaging system as in claim 1 further comprising a magnet positioned inside the main compartment and configured to hold the wearable biosensor in the secure position.

5. The packaging system as in claim 1 wherein the receptacle further comprises at least one antenna configured to support communication protocols to the wearable biosensor and to an external device selected from the group consisting of Bluetooth low energy, NFC or 5G, and wherein the external device is configured to run a mobile app also communicating with the wearable biosensor.

6. The packaging system as in claim 1 wherein the receptacle further comprises a charging coil configured to receive and send power from an external power source, recharge the battery in the receptacle, and recharge a battery in the biosensor.

7. The device of claim 3 wherein the feedback indicator comprises a physical or virtual device selected from the group consisting of an audio speaker including a microelectromechanical system (MEMS) speaker, a vibration mechanism, and a light-emitting diode (LED) on the wearable device and a notification through Bluetooth or similar signals to a mobile device containing an app.

8. The device of claim 1 wherein the vibration mechanism is selected from the group consisting of an eccentric rotating mass actuator (ERM), a linear resonant actuator (LRA), a piezoelectric actuator, electroactive polymers (EAPs), microelectromechanical systems (MEMS), a tactile haptic-based oscillation/resonance actuator and a voice coil actuator.

9. The device of claim 1 wherein a driving signal of the vibration mechanism is selected from the group consisting of amplitude, frequency and on/off keying.

10. The device of claim 1 wherein the feedback indicator is configured to provide a notification selected from the group of a sound, a light, a vibration or a message delivered to the app on the mobile device.

11. The packaging system in claim 1 wherein the body of the receptacle further comprises a device configured to push the wearable biosensor into the skin and the device is selected from the group consisting of a force actuator, a spring, a pneumatic pump and a solenoid coil.

12. The packaging system as in claim 1 wherein the microcontroller is equipped with safety and control enhancement modes which are selected from the group consisting of adaptive control algorithms, fail safe lock and retraction, and user control modes.

13. The packaging system as in claim 12 wherein the adaptive control algorithms are selected from the group consisting of proportional-integrative-derivative (PID) control and skin impedance detection.

14. The packaging system as in claim 12 wherein the failsafe lock and retraction mode is selected from the group consisting of mechanical locking and sensor error protocol.

15. The packaging system as in claim 12 wherein the user control mode is selected from the group consisting of manual override and gentle versus fast mode.

16. The packaging system as in claim 1 further comprising holders positioned on the inner surface of the at least one wall configured to fix the wearable biosensor in the secure position.

17. The packaging system as in claim 16 wherein the holders are flexible and configured to absorb force.

18. The packaging system as in claim 16 further comprising at least one additional of the holders on the bottom of the main compartment.

19. The packaging system as in claim 1 further comprising at least one humidity sensor.

20. The packaging system as in claim 1 further comprising at least one temperature sensor.

* * * * *